(12) United States Patent
Shiraishi et al.

(10) Patent No.: US 6,891,700 B2
(45) Date of Patent: May 10, 2005

(54) HEAD GIMBAL ASSEMBLY

(75) Inventors: Masashi Shiraishi, Kwai Chung (HK); Takeshi Wada, Tokyo (JP); Takashi Honda, Tokyo (JP)

(73) Assignees: TDK Corporation, Tokyo (JP); SAE Magnetics (H.K.) Ltd., Kwai Chung (HK)

( * ) Notice: Subject to any disclaimer, the term of this patent is extended or adjusted under 35 U.S.C. 154(b) by 324 days.

(21) Appl. No.: 10/077,754

(22) Filed: Feb. 20, 2002

(65) Prior Publication Data

US 2002/0181156 A1 Dec. 5, 2002

(30) Foreign Application Priority Data

Feb. 27, 2001 (JP) ........................................ 2001-051997

(51) Int. Cl.[7] ................................................ G11B 5/48
(52) U.S. Cl. ................................................ 360/245.9
(58) Field of Search ............................ 360/245.9, 245.8, 360/244.1, 244.2, 244.3, 244.4, 244.5, 244.6, 244.7, 244.8, 244.9

(56) References Cited

U.S. PATENT DOCUMENTS

| | | | | |
|---|---|---|---|---|
| 5,995,329 | A | * 11/1999 | Shiraishi et al. | 360/245.9 |
| 6,388,840 | B1 | * 5/2002 | Ohwe | 360/244.1 |
| 6,420,659 | B1 | * 7/2002 | Tsutsumi et al. | 174/254 |
| 6,498,702 | B1 | * 12/2002 | Shimizu et al. | 360/244.1 |

FOREIGN PATENT DOCUMENTS

| | | | |
|---|---|---|---|
| GB | 2 320 977 | * | 7/1998 |
| GB | 2 321 761 | * | 8/1998 |
| JP | 05-022005 | | 1/1993 |
| JP | 09-107210 | | 4/1997 |
| JP | 09-282624 | | 10/1997 |
| JP | 10-284691 | | 10/1998 |
| JP | 11-507465 | | 6/1999 |
| JP | 2000-311324 | | 11/2000 |
| WO | WO 97/36290 | | 10/1997 |

OTHER PUBLICATIONS

English Translation JP 09–282624; Shiraishi et al. Oct. 1997.*

* cited by examiner

Primary Examiner—Allen Heinz
Assistant Examiner—Christopher R. Magee
(74) Attorney, Agent, or Firm—Oblon, Spivak, McClelland, Maier & Neustadt, P.C.

(57) ABSTRACT

An HGA includes a magnetic head slider with at least one thin-film magnetic head element, a metal suspension for supporting the magnetic head slider, signal trace conductors formed via an insulation material layer on the metal suspension, for transmitting signals of the at least one thin-film magnetic head element, and external signal connection pads formed via an insulation material layer on the metal suspension and electrically connected to the signal trace conductors. At least part of the metal suspension under the external signal connection pads is removed.

16 Claims, 8 Drawing Sheets

IMPEDANCE

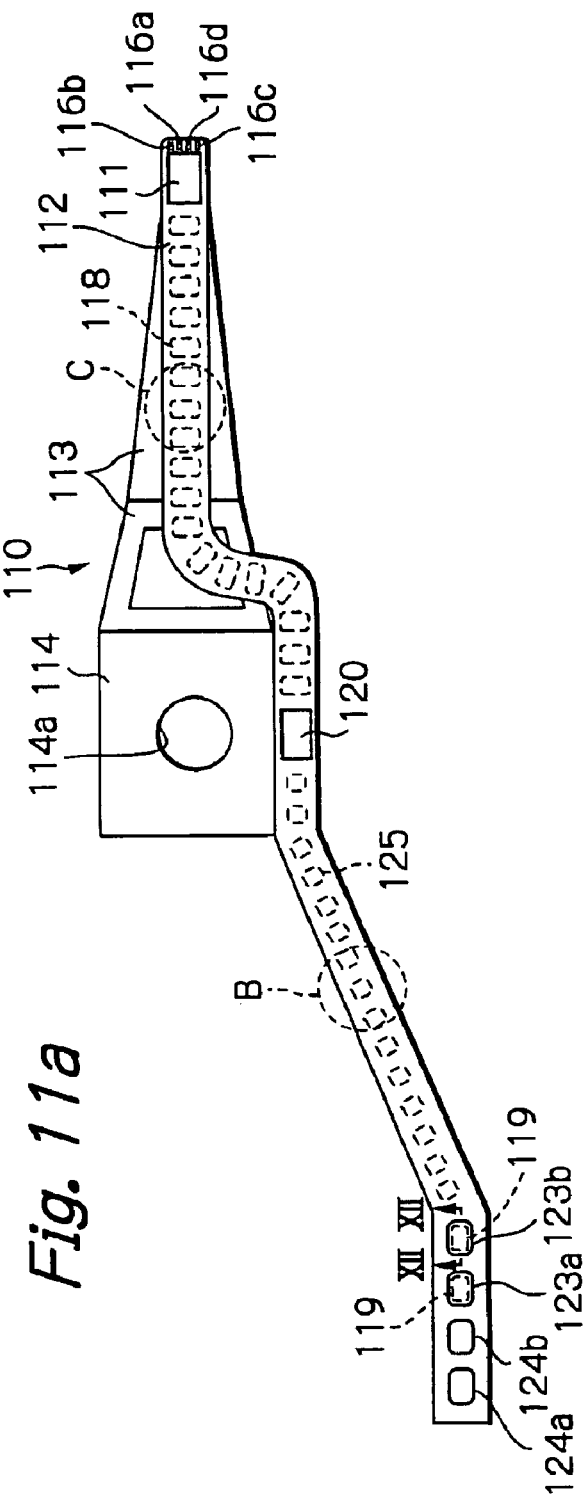
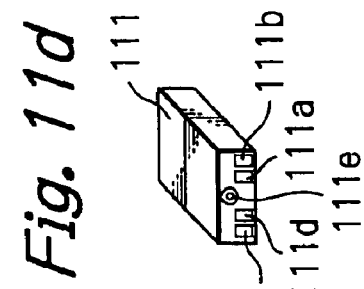
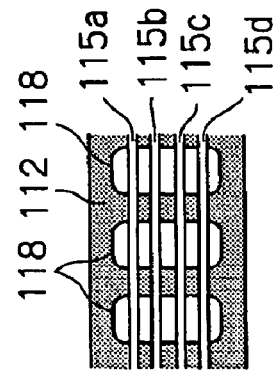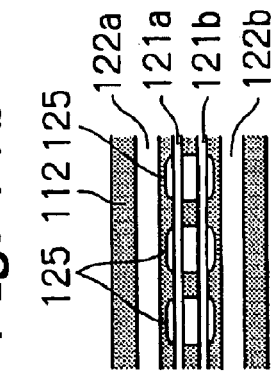

HEAD GIMBAL ASSEMBLY

FIELD OF THE INVENTION

The present invention relates to a head gimbal assembly (HGA) used in a magnetic disk storage apparatus or in a magneto-optical disk storage apparatus.

DESCRIPTION OF THE RELATED ART

An HGA with a metal suspension on which a lead conductor pattern of trace conductors and connection pads for a thin-film magnetic head element is formed is known from, for example, Ohe et al. (Japanese Patent Publication 06215513 A) and Erpelding et al. (U.S. Pat. No. 4,996,623).

Ohe et al. discloses forming of a lead conductor pattern for connections with a thin-film magnetic head element on a load beam by using photolithography, whereas Erpelding et al. discloses a laminated suspension provided with a flexible plastic material sheet, a stainless steel layer bonded to one surface of the sheet and a copper layer having a pattern of trace conductors for electrical connections and bonded to the other surface of the sheet.

In both of these known arts, the trace conductors for connections with the thin-film magnetic head element are formed on an insulating material layer laminated on a base metal layer. As a result, a capacitor may be produced between the trace conductors and the base metal layer. Since the base metal layer will be grounded, a parasitic capacitance will appear between the lead conductor pattern and the ground. This parasitic capacitance will incorporate with a parasitic inductance produced by the trace conductors and with an inductance component of the thin-film magnetic head element, and thus will cause a resonance near the data transmission frequency. If such resonance occurs, no reading data with a frequency higher than this resonance frequency can be transmitted.

In order to resolve such problems of the prior art, an inventor of this application had proposed an idea for reducing a parasitic capacitance between the trace conductors and the ground by forming via holes or recesses through or on a suspension at positions under the signal trace conductors (Shiraishi et al. (Japanese Patent Publication 09282624 A)).

However, even if the parasitic capacitance is tried to reduce by such known art, it is difficult to completely suppress the generation of a parasitic capacitance. Thus, demands for a higher recording frequency and a higher reproducing frequency in the magnetic disk in accordance with the requirement forever increasing data storage capacities and densities in today's HDDs cannot be sufficiently satisfied.

SUMMARY OF THE INVENTION

It is therefore an object of the present invention to provide an HGA, whereby a recording frequency and a reproducing frequency can be more enhanced.

The present invention relates to an HGA includes a magnetic head slider with at least one thin-film magnetic head element, a metal suspension for supporting the magnetic head slider, signal trace conductors formed via an insulation material layer on the metal suspension, for transmitting signals of the at least one thin-film magnetic head element, and external signal connection pads formed via an insulation material layer on the metal suspension and electrically connected to the signal trace conductors. Particularly, according to the present invention, at least part of the metal suspension under the external signal connection pads is removed.

The technique for reducing a parasitic capacitance between the trace conductors and the metal suspension is known from Shiraishi et al. In case that an HGA is fabricated based upon this parasitic capacitance reducing technique, to have a plurality of via holes through the metal suspension at position under the signal trace conductors, the data transmission frequency increases to some extent. However, this increasing in the transmission frequency is limited and thus it is insufficient to satisfy the recent demand for a higher transmission frequency. Inventors of this application had analyzed, by using a time domain reflect (TDR) meter which is well-known measurement tool in a field of high-speed digital design, an impedance characteristics of a conventional structure HGA fabricated based upon the known parasitic capacitance reducing technique.

FIG. 1 illustrates a measurement result of the characteristic impedance of the HGA using the TDR meter. In the figure, the lateral axis represents a time corresponding to a position of the signal trace conductors of the HGA shown below the graph, and the longitudinal axis represents an impedance. As will be noted from the figure, a large capacitive discontinuous section of the characteristic impedance is appeared at the position of the external signal connection pads 10 of the HGA. It is considered that this discontinuousness occurs due to a large parasitic capacitance produced between the metal suspension and the external signal connection pads 10 that have a extremely large area in comparison with the signal trace conductors or another connection pads.

Therefore, according to the present invention, at least part of the metal suspension under the external signal connection pads is removed to heavily reduce the parasitic capacitance between these connection pads and the metal suspension. As a result, it is possible to further increase an electrical resonance frequency and to greatly increase the data transmission frequency. Thus, recent demand for a higher transmission frequency can be sufficiently satisfied.

The capacitance C of a capacitor is in general determined from $C \approx \epsilon_r S/d$, where $\epsilon_r$ is a relative dielectric constant of the insulating material layer between opposed capacitor's electrodes, S is a facing area of the opposed electrodes and d is a distance between the electrodes. The parasitic capacitance can be reduced therefore by:

(1) increasing the distance d between the metal suspension and the conductive pattern;

(2) decreasing the relative dielectric constant $\epsilon_r$ of the insulating material layer between the metal suspension and the conductive pattern; and/or (3) decreasing the facing area S of the metal suspension and the conductive pattern.

However, if the thickness of the insulating material layer between the metal suspension and the connection pads is increased to increase the distance d as described at (1), flexibility of the suspension will be mostly lost. Furthermore, decreasing of the relative dielectric constant $\epsilon_r$ as described at (2) is difficult because there is few insulating material having a relative dielectric constant lower than that of polyimide now used ($\epsilon_r=3.3$) and having good layer insulation characteristics. Therefore, according to the present invention, at least part of the metal suspension under the external signal connection pads is removed to decrease the facing area S as described at (3) and thus to reduce the parasitic capacitance between the conductive pattern and the metal suspension.

In addition, since there is no metal layer under the external signal connection pads, air under these connection pads functions as a thermal insulation layer, so as to improve a solder bonding performance when soldering.

It is preferred that the metal suspension includes a metal load beam and a metal flexure disposed on the metal load beam, the external signal connection pads being formed on the metal flexure, and that at least part of the metal flexure under the external signal connection pads is removed by forming at least one via hole for example.

In this case, it is preferred that the at least part of the metal load beam under the external signal connection pads is also removed by forming at least one via hole for example.

It is also preferred that the metal suspension includes a metal flexure, the external signal connection pads being formed on the metal flexure, and that at least part of the metal flexure under the external signal connection pads is removed by forming at least one via hole for example.

It is further preferred that the signal trace conductors are directly connected to the at least one thin-film magnetic head element.

It is still further preferred that the HGA further includes an drive IC chip mounted on the metal suspension, the drive IC chip including a circuit for the at least one thin-film magnetic head element, and that the signal trace conductors are connected to the at least one thin-film magnetic head element through the drive IC chip.

It is preferred that the HGA further includes power-supply trace conductors formed through an insulation material layer on the metal suspension, for supplying power to the drive IC chip, and external power-supply connection pads formed through an insulation material layer on the metal suspension and electrically connected to the power-supply trace conductors.

Preferably, the metal suspension under the external power-supply connection pads is remained. Also, preferably, the metal suspension under the power-supply trace conductors is remained.

It is preferred that at least part of the metal suspension under the signal trace conductor is removed.

It is also preferred that the metal suspension includes a metal load beam and a metal flexure disposed on the metal load beam, the signal trace conductors being formed on the metal flexure, and that at least part of the metal flexure under the signal trace conductors is removed. In this case, preferably, the at least part of the metal load beam under the signal trace conductors is also removed.

It is further preferred that the metal suspension includes a metal flexure, the signal trace conductors being formed on the metal flexure, and that at least part of the metal flexure under the signal trace conductors is removed.

Further objects and advantages of the present invention will be apparent from the following description of the preferred embodiments of the invention as illustrated in the accompanying drawings.

BRIEF DESCRIPTION OF THE DRAWINGS

FIG. 2b illustrates a structure of signal trace conductors and a flexure in a circle B shown in FIG. 2a;

FIG. 2c shows an oblique view illustrating a structure of a magnetic head slider shown in FIG. 2a;

FIG. 8b illustrates a structure of power-supply trace conductors, signal trace conductors and a flexure in a circle B shown in FIG. 8a;

FIG. 8c illustrates a structure of the signal trace conductors and the flexure in a circle C shown in FIG. 8a;

FIG. 8d shows an oblique view illustrating a structure of a magnetic head slider shown in FIG. 8a;

FIG. 11a shows a plane view of a still further embodiment of a HGA according to the present invention;

FIG. 11b illustrates a structure of power-supply trace conductors, signal trace conductors and a flexure in a circle B shown in FIG. 11a;

FIG. 11c illustrates a structure of the signal trace conductors and the flexure in a circle C shown in FIG. 11a;

FIG. 11d shows an oblique view illustrating a structure of a magnetic head slider shown in FIG. 11a;

FIG. 12 shows a XII—XII line sectional view of FIG. 11a; and

DESCRIPTION OF THE PREFERRED EMBODIMENTS

Figure 2A:
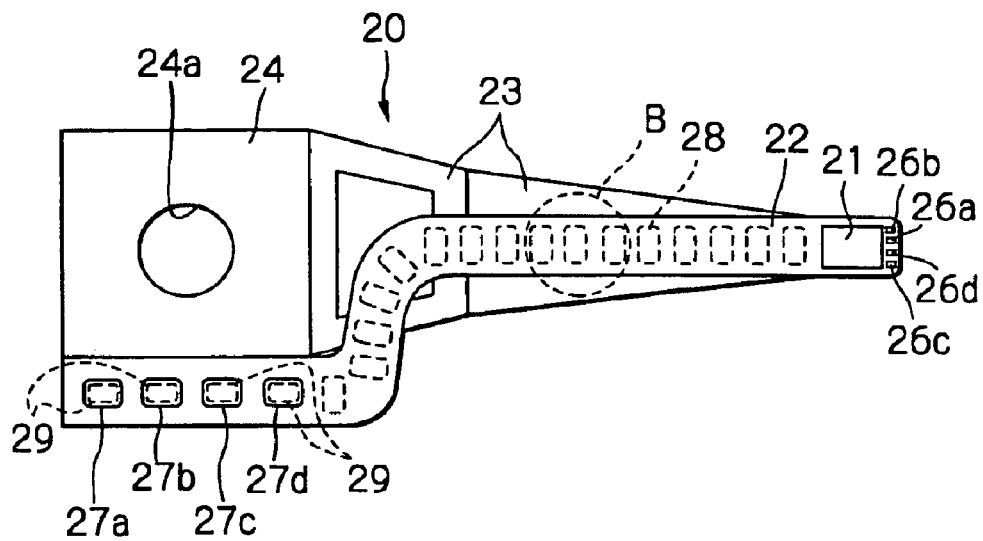
FIG. 2a shows a plane view of a preferred embodiment of a HGA according to the present invention.
Figure 2B:
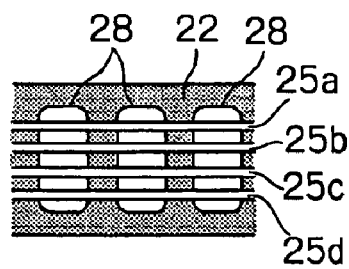
Figure 2C:
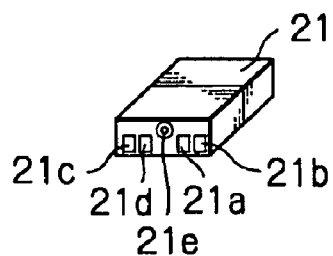
Figure 3:
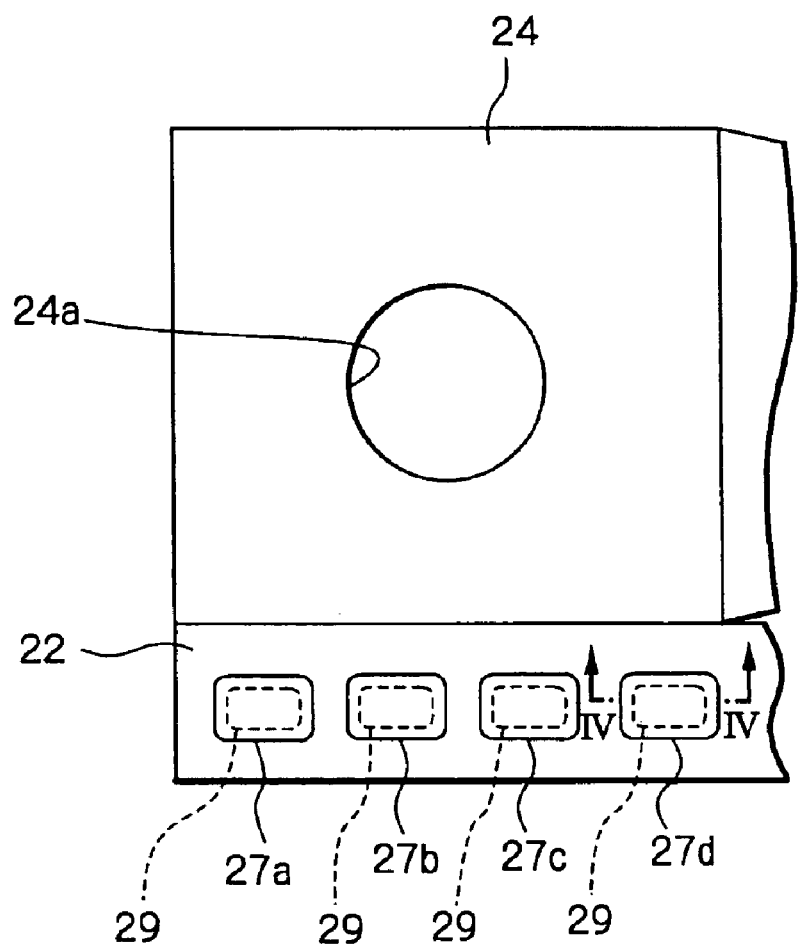
FIG. 3 shows an enlarged plane view illustrating in detail a section of external signal connection pads shown in FIGS. 2a and 2b.
Figure 4:
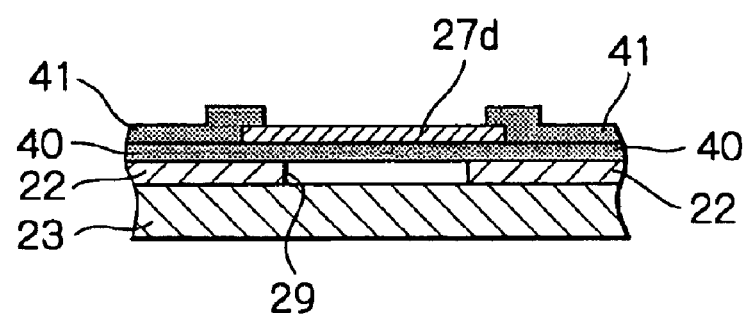
FIG. 4 shows a IV—IV line sectional view of FIG. 3.

FIG. 2a illustrates a preferred embodiment of a HGA according to the present invention, FIG. 2b illustrates a structure of signal trace conductors and a flexure in a circle B shown in FIG. 2a, FIG. 2c illustrates a structure of a magnetic head slider shown in FIG. 2a, FIG. 3 illustrates in detail a section of external signal connection pads shown in FIGS. 2a and 2b, and FIG. 4 is a IV—IV line sectional view of FIG. 3. In FIG. 2a, indication of the signal trace conductors is omitted.

As shown in these figures, the HGA is assembled by fixing a magnetic head slider 21 having at least one thin-film magnetic head element 21e to a top end section of a suspension 20. Although it is not shown, a drive IC chip for driving the head element 21e and for driving the head element and for amplifying a read-out signal from the head element may be mounted on a middle section of this suspension 20.

The suspension 20 is substantially constituted by a resilient flexure 22 which carries the slider 21 at its one end section, a resilient load beam 23 that supports and fixes the flexure 22, a base plate 24 fixed to a base end section of the load beam 23.

The magnetic head slider 21 has the at least one thin-film magnetic head element 21e consisting of a write head element and a magnetoresistive effect (MR) read head element. Although it is a mere example, the size of the magnetic head slider 21 is 1.25 mm×1.0 mm×0.3 mm.

The flexure 22 has a flexible tongue (not shown) depressed by a dimple (not shown) formed on the load beam 23 and has elasticity for flexibly supporting by the tongue the magnetic head slider 21 to provide a free attitude to the slider. The flexure 22 is made of in this embodiment a stainless steel plate (for example SUS304TA) with a thickness of about 25 μm and a substantially constant width.

Figure 1:
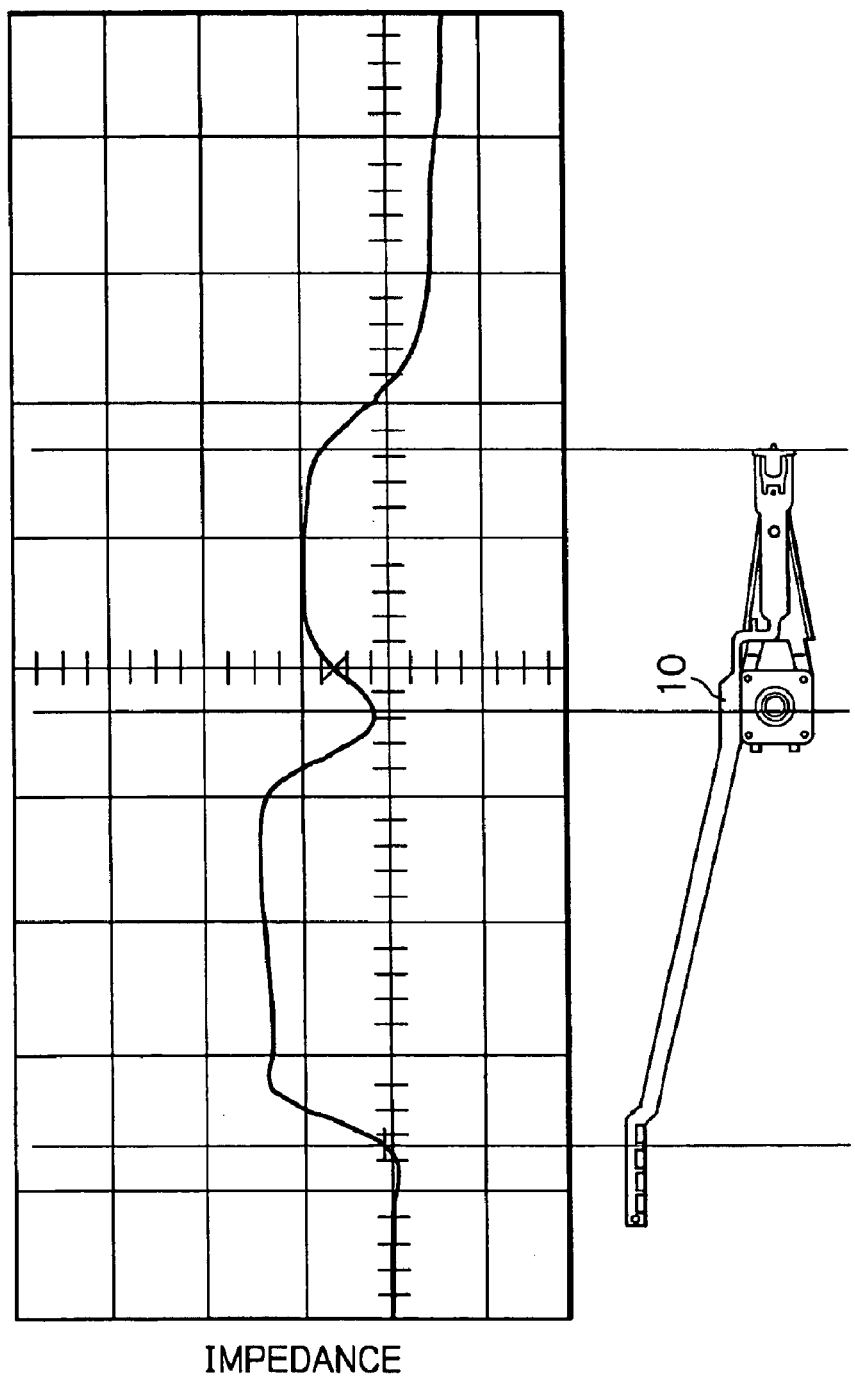
FIG. 1 illustrates the already described measurement result of the characteristic impedance of the prior art HGA using the TDR meter.

As for lead lines, four signal trace conductors 25a–25d of a thin film conductive pattern are formed on the flexure 22 along its whole length. One ends of the trace conductors 25a–25d are connected to four head connection pads 26a–26d. These head connection pads 26a–26d are electrically connected to four terminal electrodes 21a–21d of the magnetic head slider 21 attached to one end section (top end section) of the flexure 22. The other ends of the trace conductors 25a–25d are connected to the four external signal connection pads 27a–27d formed on the other end section (rear end section) of the flexure 22. To the external signal connection pads 27a–27d, in fact, a link FPC (flexible print circuit) shown in FIG. 1 will be connected.

The thin film conductive pattern can be formed by a well known method similar to the patterning method of forming a printed circuit board on a thin metal plate. Namely, as shown in FIG. 4, the conductive pattern is formed by sequentially depositing a polyimide layer 40 with a thickness of about 5 μm (lower insulating material layer), a patterned Cu layer with a thickness of about 4 μm (signal trace conductors layer 25a–25d, head connection pads 26a–26d or external signal connection pads 27a–27d), and a polyimide layer 41 with a thickness of about 5 μm (upper insulating material layer) on the flexure 22 in this order. In a modification, a preliminarily deposited multi-layered film of the conductive pattern may be laminated on the flexure 22. Within the regions of the connection pads, a Ni layer and an Au layer are sequentially deposited on the Cu layer and there is no upper insulating material layer.

The load beam 23 has elasticity for depressing the slider 21 toward the direction of a magnetic disk in operation so as to provide a stable flying height. This load beam 23 is made of in this embodiment a resilient stainless steel plate with a thickness of about 60–65 μm and supports the flexure 22 along its whole length. The load beam 23 has a shape with a width that narrows with approaching to its top end. Fixing of the flexure 22 to the load beam 23 is performed by spot welding at a plurality of points using a laser beam for example. As will be noted, in this embodiment, the suspension 20 has a three-pieces structure constituted by individual components of the flexure 22, the load beam 23 and the base plate 24. In such three-pieces structure, stiffness of the flexure 22 is set to be lower than that of the load beam 23

The base plate 24 is made of a stainless steel plate or an iron plate with a thickness larger than that of the load beam 23, and is fixed to the base end section of the load beam 23 by spot welding using a laser beam for example. The HGA will be attached to each support arm (not shown) by mechanically swaging an attachment part 24a of the base plate 24 to the support arm.

As shown in FIGS. 2a and 2b, a plurality of via holes 28 are formed by for example etching through a stainless steel plate of the flexure 22 at positions where the signal trace conductors 25a–25d pass. These via holes 28 formed through the flexure 22 reduce effective area of the flexure 22 which operates as the opposed electrode of the trace conductors. Thus, according to this configuration, the parasitic capacitance between the signal trace conductors and the flexure 22 can be lowered. Further, forming of the via holes 28 through the flexure 22 will reduce the weight of the suspension itself resulting the mechanical resonance characteristics and also the dynamic vibration characteristics of the whole suspension to greatly improve.

The most important configuration in this embodiment is that a plurality of via holes 29 are formed by for example etching through a stainless steel plate of the flexure 22 at positions of the external signal connection pads 27a–27d as shown in FIGS. 2a–4. Therefore, effective area of the flexure 22 which operates as the opposed electrode of the external signal connection pads 27a–27d having a area extremely larger than that of the signal trace conductors 25a–25d is reduced, and thus it is possible to extremely lower the parasitic capacitance between the external signal connection pads and the flexure. Particularly, in this embodiment, since the via holes 29 are formed through only the flexure 22, the external connection pads 27a–27d face to the load beam 23 located under the flexure 22 in the region of the via holes 29 to enlarge the distance of the capacitor electrodes. As a result, the parasitic capacitance between the external signal connection pads and the flexure or the base plate extremely lowers. In consequence, it is possible to prevent an impedance-mismatching occurred at this region and also to completely suppress an influence of electrical resonance due to the lead line. Thus, a recording and reproducing operations at a higher frequency can be expected.

In addition, since there is no metal layer but the via holes are existed under the external signal connection pads 27a–27d, air in the via holes functions as a thermal insulation layer to improve a solder bonding performance when soldering.

The size of each via hole 29 is in this embodiment is smaller than that of each of the external signal connection pads 27a–27d. However, in modifications, the via hole size may be equal to or larger than the size of the external signal connection pads 27a–27d. Although each of the via holes 29 is shaped in roughly rectangular in this embodiment, in modifications, it can be formed in any shape such as an ellipse or another polygon. The shape and/or size of the via holes may be the same or different with each other.

Figure 5:
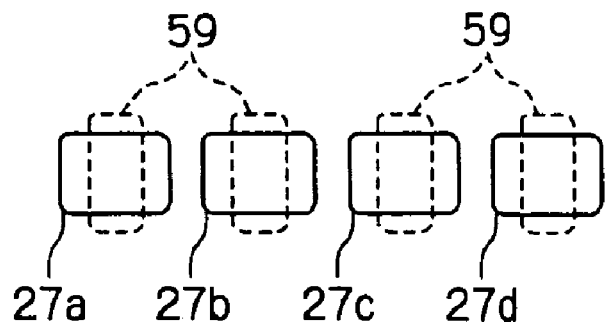
FIG. 5 shows a plane view illustrating a modification of via holes.

Although it is a mere modification, formed may be via holes 59 each having a roughly rectangular shape and a longitudinal axis that is perpendicular to a longitudinal axis of the external signal connection pads 27a–27d as shown in FIG. 5. Since the extracting direction of the signal trace conductors 25a–25d from the respective external signal connection pads 27a–27d is perpendicular to the longitudinal axis of these external signal connection pads 27a–27d, parts of the flexure 22 under the signal trace conductors are additionally removed resulting more reducing the parasitic capacitance.

Figure 6:
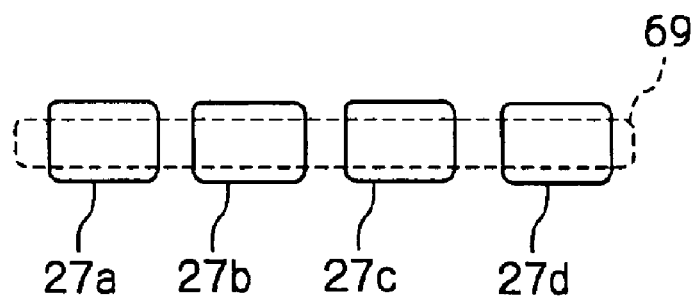
FIG. 6 shows a plane view illustrating another modification of via holes.

Furthermore, although it is another modification, a single continuous via hole 69 may be formed through the flexure 22 under the four the external signal connection pads 27a–27d as shown in FIG. 6. Also, two or more via holes may be formed through the flexure 22 under each external signal connection pad (not shown). Namely, via holes of the different number from that of he external signal connection pads 27a–27d may be formed.

Figure 7:
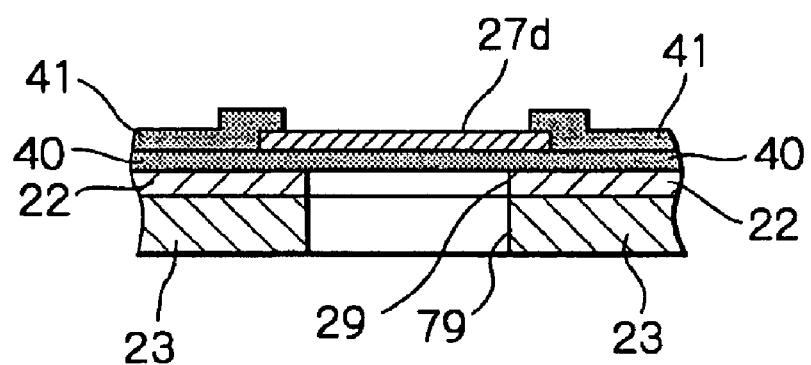
FIG. 7 shows a sectional view illustrating an external signal connection pad of another embodiment of a HGA according to the present invention.

FIG. 7 illustrates an external signal connection pad of another embodiment of a HGA according to the present invention and corresponds to a IV—IV line sectional view of FIG. 3.

In this embodiment, not only the via holes 29 are formed through the flexure 22 at positions of the external signal connection pads 27a–27d but also via holes 79 are formed through the load beam 23 laminated under the flexure 22 at the positions of the external signal connection pads 27a–27d. At positions of the signal trace conductors, the similar via hole are formed through both the flexure 22 and the load beam 23.

According to this embodiment, since the via holes 79 are additionally formed through the load beam 23, the parasitic capacitance can be further reduced and the weight of the suspension can be more reduced.

Another configurations, modifications, operations and advantages in this embodiment are substantially the same as these in the embodiment of FIGS. 2a–6.

Figure 8A:
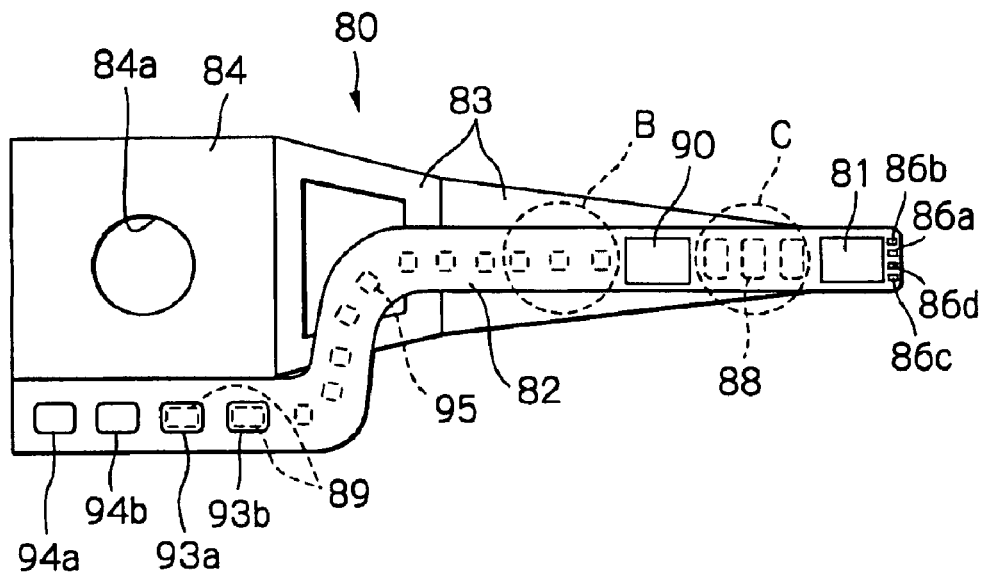
FIG. 8a shows a plane view of a further embodiment of a HGA according to the present invention.
Figure 8B:
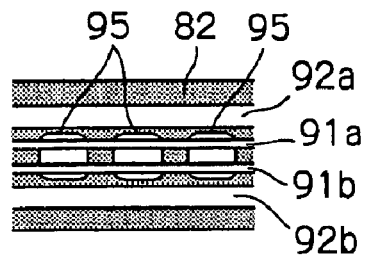
Figure 8C:
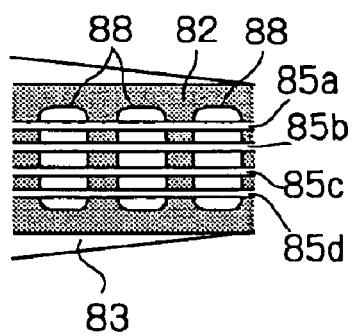
Figure 8D:
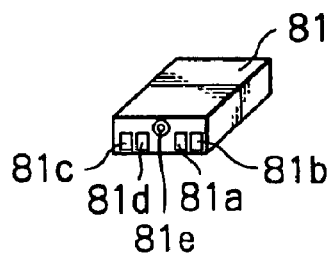
Figure 9:
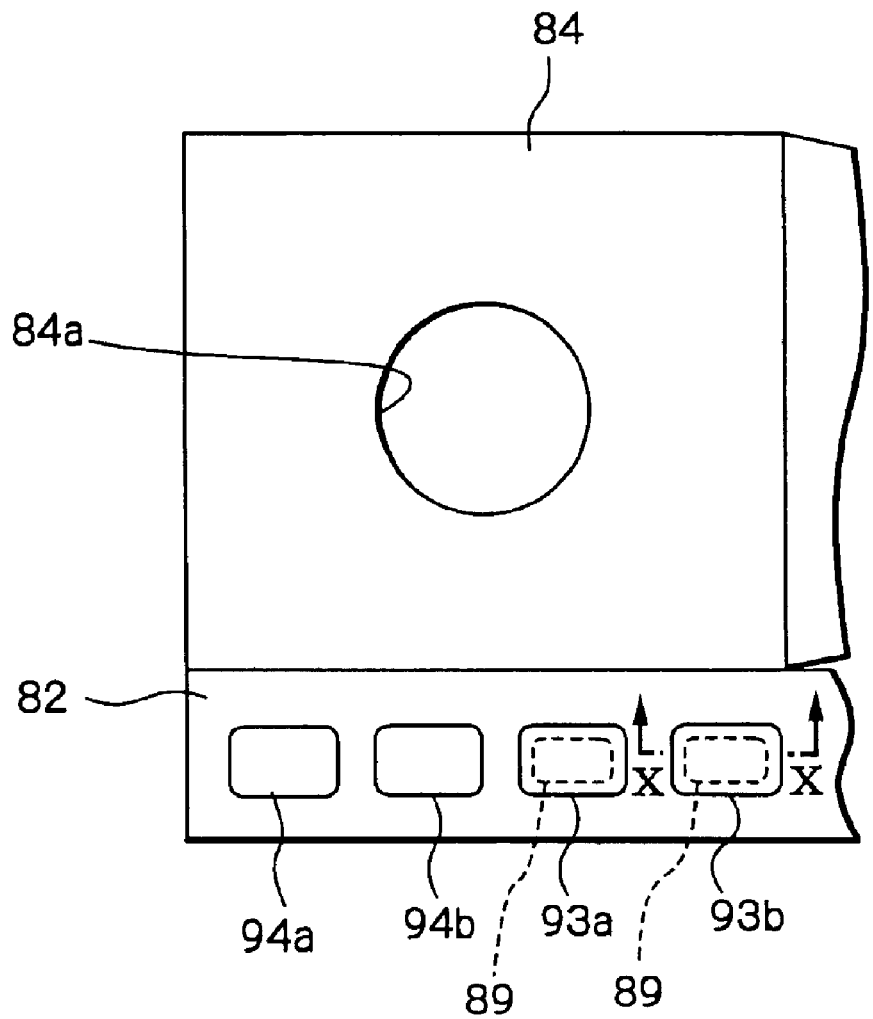
FIG. 9 shows an enlarged plane view illustrating in detail a section of external power-supply trace conductors and external signal connection pads shown in FIGS. 8a–8c.

FIG. 8a illustrate a further embodiment of a HGA according to the present invention, FIG. 8b illustrates a structure of power-supply trace conductors, signal trace conductors and a flexure in a circle B shown in FIG. 8a, FIG. 8c illustrates a structure of the signal trace conductors and the flexure in a circle C shown in FIG. 8a, FIG. 8d illustrates a structure of a magnetic head slider shown in FIG. 8a, FIG. 9 illustrates in detail a section of external power-supply trace conductors and external signal connection pads shown in FIGS. 8a–8c, and FIG. 10 is a X—X line sectional view of FIG. 9. In FIG. 8a, indication of the power-supply trace conductors and the signal trace conductors is omitted.

As shown in these figures, the HGA is assembled by fixing a magnetic head slider 81 having at least one thin-film magnetic head element 81e to a top end section of a suspension 80. In this embodiment, particularly, a drive IC chip 90 for driving the head element 81e and for driving the head element and for amplifying a read-out signal from the head element is mounted on a middle section of the suspension 80.

The suspension 80 is substantially constituted by a resilient flexure 82 which carries the slider 81 at its one end section, a resilient load beam 83 that supports and fixes the flexure 82, a base plate 84 fixed to a base end section of the load beam 83.

The magnetic head slider 81 has the at least one thin-film magnetic head element 81e consisting of a write head element and an MR read head element. Although it is a mere example, the size of the magnetic head slider 81 is 1.25 mm×1.0 mm×0.3 mm.

The flexure 82 has a flexible tongue (not shown) depressed by a dimple (not shown) formed on the load beam 83 and has elasticity for flexibly supporting by the tongue the magnetic head slider 81 to provide a free attitude to the slider. The flexure 82 is made of in this embodiment a stainless steel plate (for example SUS304TA) with a thickness of about 25 $\mu$m and a substantially constant width.

As for lead lines, four signal trace conductors 85a–85d of a thin film conductive pattern are formed on the flexure 82 in a top end side region between a top end of the flexure 82 and the drive IC chip 90. One ends of the trace conductors 85a–85d are connected to four head connection pads 86a–86d. These head connection pads 86a–86d are electrically connected to four terminal electrodes 81a–81d of the magnetic head slider 81 attached to one end section (top end section) of the flexure 82. The other ends of the trace conductors 85a–85d are connected to chip connection pads (not shown) formed on the flexure 82.

In a rear end side region between a rear end of the flexure 82 and the drive IC chip 90, two signal trace conductors 91a and 91b and two power-supply trace conductors 92a and 92b of a thin film conductive pattern are formed on the flexure 82 as for lead lines. One ends of these signal trace conductors 91a and 91b and these power-supply trace conductors 92a and 92b are connected the chip connection pads (not shown) formed on the flexure 82, and the other ends are connected to two external signal connection pads 93a and 93b and two external power-supply connection pads 94a and 94b formed in the other end section (rear end section) of the flexure 82. To the external signal connection pads 93a and 93b and the external power-supply connection pads 94a and 94b, in fact, the link FPC shown in FIG. 1 will be connected.

Figure 10:
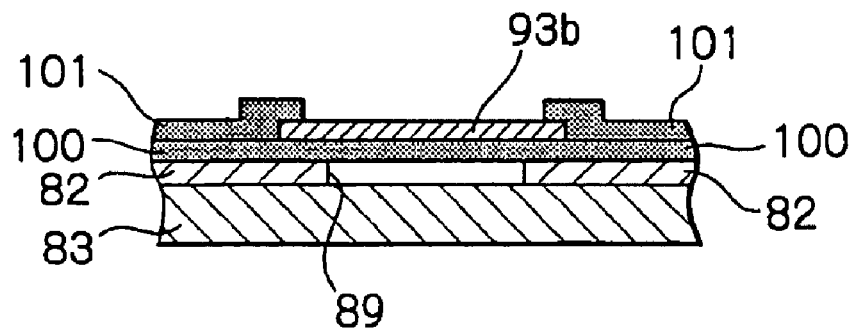
FIG. 10 shows a X—X line sectional view of FIG. 9.

The thin film conductive pattern can be formed by a well known method similar to the patterning method of forming a printed circuit board on a thin metal plate. Namely, as shown in FIG. 10, the conductive pattern is formed by sequentially depositing a polyimide layer 100 with a thickness of about 5 $\mu$m (lower insulating material layer), a patterned Cu layer with a thickness of about 4 $\mu$m (signal trace conductors layer 85a–85d, 91a and 91b, power-supply trace conductors 92a and 92b, head connection pads 86a–86d, chip connection pads, external signal connection pads 93a and 93b, or external power-supply connection pads 94a and 94b), and a polyimide layer 101 with a thickness of about 5 $\mu$m (upper insulating material layer) on the flexure 82 in this order. In a modification, a preliminarily deposited multi-layered film of the conductive pattern may be laminated on the flexure 82. Within the regions of the connection pads, a Ni layer and an Au layer are sequentially deposited on the Cu layer and there is no upper insulating material layer.

The load beam 83 has elasticity for depressing the slider 81 toward the direction of a magnetic disk in operation so as to provide a stable flying height. This load beam 83 is made of in this embodiment a resilient stainless steel plate with a thickness of about 60–65 $\mu$m and supports the flexure 82 along its whole length. The load beam 83 has a shape with a width that narrows with approaching to its top end. Fixing of the flexure 82 to the load beam 83 is performed by spot welding at a plurality of points using a laser beam for example. As will be noted, in this embodiment, the suspension 80 has a three-pieces structure constituted by individual components of the flexure 82, the load beam 83 and the base plate 84. In such three-pieces structure, stiffness of the flexure 82 is set to be lower than that of the load beam 83.

The base plate 84 is made of a stainless steel plate or an iron plate with a thickness larger than that of the load beam 83, and is fixed to the base end section of the load beam 83 by spot welding using a laser beam for example. The HGA will be attached to each support arm (not shown) by mechanically swaging an attachment part 84a of the base plate 84 to the support arm.

As shown in FIGS. 8a–8c, a plurality of via holes 88 and 95 are formed by for example etching through a stainless steel plate of the flexure 82 at positions where the signal trace conductors 85a–85d, 91a and 91b pass. These via holes 88 and 95 formed through the flexure 82 reduce effective area of the flexure 82 which operates as the opposed electrode of the trace conductors. Thus, according to this configuration, the parasitic capacitance between the signal trace conductors and the flexure 82 can be lowered. Further, forming of the via holes 88 and 95 through the flexure 82 will reduce the weight of the suspension itself resulting the mechanical resonance characteristics and also the dynamic vibration characteristics of the whole suspension to greatly improve. However, no via hole is formed through the flexure 82 at positions where the power-supply trace conductors 92a and 92b pass because it is desired that the power-supply lines have a large capacitance.

The most important configuration in this embodiment is that a plurality of via holes 89 are formed by for example etching through a stainless steel plate of the flexure 82 at positions of the external signal connection pads 93a and 93b, as shown in FIGS. 8a–10. Therefore, effective area of the flexure 82 which operates as the opposed electrode of the external signal connection pads 93a and 93b having a area extremely larger than that of the signal trace conductors 85a–85d, 91a and 91b is reduced, and thus it is possible to extremely lower the parasitic capacitance between the external signal connection pads and the flexure. Particularly, in this embodiment, since the via holes 89 are formed through only the flexure 82, the external signal connection pads 93a and 93b face to the load beam 83 located under the flexure 82 in the region of the via holes 89 to enlarge the distance of the capacitor electrodes. As a result, the parasitic capacitance between the external signal connection pads and the flexure or the base plate extremely lowers. In consequence, it is possible to prevent an impedance-mismatching occurred at this region and also to completely suppress an influence of electrical resonance due to the lead line. Thus, a recording and reproducing operations at a higher frequency can be expected.

In addition, since there is no metal layer but the via holes are existed under the external signal connection pads 93a and 93b, air in the via holes functions as a thermal insulation layer to improve a solder bonding performance when soldering.

No via hole is formed through the stainless steel plate of the flexure 82 at positions of the external power-supply connection pads 94a and 94b because as mentioned before it is desired that the power-supply lines have a large capacitance.

In this embodiment, the two signal trace conductors 91a and 91b and the two external signal connection pads 93a and 93b are formed in the rear end side region between a rear end of the flexure 82 and the drive IC chip 90 in order to flow a write signal and a read signal alternately. An HGA with four signal trace conductors and four external signal connection pads is applicable to the present invention as well as this embodiment.

Another configurations, modifications, operations and advantages in this embodiment are substantially the same as these in the embodiment of FIGS. 2a–6.

Figure 12:
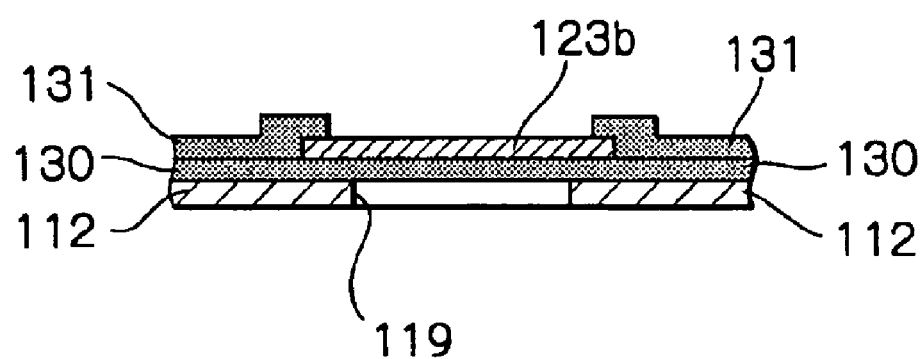

FIG. 11a illustrates a still further embodiment of a HGA according to the present invention, FIG. 11b illustrates a structure of power-supply trace conductors, signal trace conductors and a flexure in a circle B shown in FIG. 11a, FIG. 11c illustrates a structure of the signal trace conductors and the flexure in a circle C shown in FIG. 11a, FIG. 11d illustrates a structure of a magnetic head slider shown in FIG. 11a, and FIG. 12 shows a XII—XII line sectional view of FIG. 11a. In FIG. 11a, indication of the power-supply trace conductors and the signal trace conductors is omitted.

As shown in these figures, the HGA is assembled by fixing a magnetic head slider 111 having at least one thin-film magnetic head element 111e to a top end section of a suspension 110. In this embodiment, the suspension 110 has a long tail structure, and a drive IC chip 120 for driving the head element 111e and for driving the head element and for amplifying a read-out signal from the head element is mounted on the suspension 110 at a side position of a base plate 114.

The suspension 110 is substantially constituted by a resilient flexure 112 which carries the slider 111 at its one end section, a resilient load beam 113 that supports and fixes the flexure 112, the base plate 114 fixed to a base end section of the load beam 113.

The magnetic head slider 111 has the at least one thin-film magnetic head element 111e consisting of a write head element and an MR read head element. Although it is a mere example, the size of the magnetic head slider 111 is 1.25 mm×1.0 mm×0.3 mm.

The flexure 112 has a flexible tongue (not shown) depressed by a dimple (not shown) formed on the load beam 113 and has elasticity for flexibly supporting by the tongue the magnetic head slider 111 to provide a free attitude to the slider. The flexure 112 is made of in this embodiment a stainless steel plate (for example SUS304TA) with a thickness of about 25 µm and a substantially constant width.

As for lead lines, four signal trace conductors 115a–115d of a thin film conductive pattern are formed on the flexure 112 in a top end side region between a top end of the flexure 112 and the drive IC chip 120. One ends of the trace conductors 115a–115d are connected to four head connection pads 116a–116d. These head connection pads 116a–116d are electrically connected to four terminal electrodes 111a–111d of the magnetic head slider 111 attached to one end section (top end section) of the flexure 112. The other ends of the trace conductors 115a–115d are connected to chip connection pads (not shown) formed on the flexure 112.

In a rear end side region between a rear end of the flexure 112 and the drive IC chip 120, two signal trace conductors 121a and 121b and two power-supply trace conductors 122a and 122b of a thin film conductive pattern are formed on the flexure 112 as for lead lines. One ends of these signal trace conductors 121a and 121b and these power-supply trace conductors 122a and 122b are connected the chip connection pads (not shown) formed on the flexure 112, and the other ends are connected to two external signal connection pads 123a and 123b and two external power-supply connection pads 124a and 124b formed in the other end section (rear end section) of the flexure 112. As shown in FIG. 11a, these external signal connection pads 123a and 123b and external power-supply connection pads 124a and 124b are located far rear from the base plate 114 and no load beam is formed under the flexure 112 in a rear region from the base plate 114. In such long tail structure HGA, it is not necessary to use a link FPC shown in FIG. 1.

The thin film conductive pattern can be formed by a well known method similar to the patterning method of forming a printed circuit board on a thin metal plate. Namely, as shown in FIG. 12, the conductive pattern is formed by sequentially depositing a polyimide layer 130 with a thickness of about 5 µm (lower insulating material layer), a patterned Cu layer with a thickness of about 4 µm (signal trace conductors layer 115a–115d, 121a and 121b, power-supply trace conductors 122a and 122b, head connection pads 116a–116d, chip connection pads, external signal connection pads 123a and 123b, or external power-supply connection pads 124a and 124b), and a polyimide layer 131 with a thickness of about 5 µm (upper insulating material layer) on the flexure 112 in this order. In a modification, a preliminarily deposited multi-layered film of the conductive pattern may be laminated on the flexure 112. Within the regions of the connection pads, a Ni layer and an Au layer are sequentially deposited on the Cu layer and there is no upper insulating material layer.

The load beam 113 has elasticity for depressing the slider 111 toward the direction of a magnetic disk in operation so as to provide a stable flying height. This load beam 113 is made of in this embodiment a resilient stainless steel plate with a thickness of about 60–65 μm and supports a part of the flexure 112. The load beam 113 has a shape with a width that narrows with approaching to its top end. Fixing of the flexure 112 to the load beam 113 is performed by spot welding at a plurality of points using a laser beam for example. As will be noted, in this embodiment, the suspension 110 has a three-pieces structure constituted by individual components of the flexure 112, the load beam 113 and the base plate 114. In such three-pieces structure, stiffness of the flexure 112 is set to be lower than that of the load beam 113.

The base plate 114 is made of a stainless steel plate or an iron plate with a thickness larger than that of the load beam 183, and is fixed to the base end section of the load beam 113 by spot welding using a laser beam for example. The HGA will be attached to each support arm (not shown) by mechanically swaging an attachment part 114a of the base plate 114 to the support arm.

As shown in FIGS. 11a–11c, a plurality of via holes 118 and 125 are formed by for example etching through a stainless steel plate of the flexure 112 at positions where the signal trace conductors 115a–115d, 121a and 121b pass. These via holes 118 and 125 formed through the flexure 112 reduce effective area of the flexure 112 which operates as the opposed electrode of the trace conductors. Thus, according to this configuration, the parasitic capacitance between the signal trace conductors and the flexure 112 can be lowered. Further, forming of the via holes 118 and 125 through the flexure 112 will reduce the weight of the suspension itself resulting the mechanical resonance characteristics and also the dynamic vibration characteristics of the whole suspension to greatly improve. However, no via hole is formed through the flexure 112 at positions where the power-supply trace conductors 122a and 122b pass because it is desired that the power-supply lines have a large capacitance.

The most important configuration in this embodiment is that a plurality of via holes 119 are formed by for example etching through a stainless steel plate of the flexure 112 at positions of the external signal connection pads 123a and 123b as shown in FIGS. 11a and 12. Therefore, effective area of the flexure 112 which operates as the opposed electrode of the external signal connection pads 123a and 123b having a area extremely larger than that of the signal trace conductors 115a–115d, 121a and 121b is reduced, and thus it is possible to extremely lower the parasitic capacitance between the external signal connection pads and the flexure. As a result, the parasitic capacitance between the external signal connection pads and the flexure extremely lowers. In consequence, it is possible to prevent an impedance-mismatching occurred at this region and also to completely suppress an influence of electrical resonance due to the lead line. Thus, a recording and reproducing operations at a higher frequency can be expected.

In addition, since there is no metal layer but the via holes are existed under the external signal connection pads 123a and 123b, air in the via holes functions as a thermal insulation layer to improve a solder bonding performance when soldering.

No via hole is formed through the stainless steel plate of the flexure 112 at positions of the external power-supply connection pads 124a and 124b because as mentioned before it is desired that the power-supply lines have a large capacitance.

In this embodiment, the two signal trace conductors and the two external signal connection pads are formed in the rear end side region between a rear end of the flexure 112 and the drive IC chip 120 in order to flow a write signal and a read signal alternately. An HGA with four signal trace conductors and four external signal connection pads is applicable to the present invention as well as this embodiment.

Another configurations, modifications, operations and advantages in this embodiment are substantially the same as these in the embodiment of FIGS. 2a–6.

Figure 13:
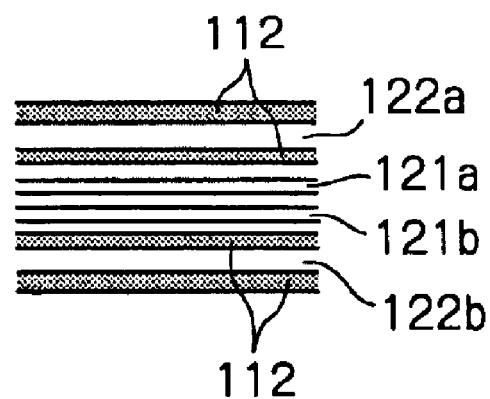
FIG. 13 illustrates a structure of power-supply trace conductors, signal trace conductors and a flexure in the circle B shown in FIG. 11a as a modification of the embodiment of FIGS 11a–11d.

FIG. 13 illustrates a structure of power-supply trace conductors, signal trace conductors and a flexure in the circle B shown in FIG. 11a as a modification of the embodiment of FIGS. 11a–11d.

In this modification, lead lines of a thin film conductive pattern are directly formed on the flexure 112 by using etching process. Particularly, in this modification, as shown in FIG. 13, a stainless steel plate of the flexure 112 under the signal trace conductors 121a and 121b is continuously and completely removed along these the trace conductors 121a and 121b without forming via holes. As a result, the parasitic capacitance can be further lowered, and the weight of the suspension itself can be more reduced.

Another configurations, modifications, operations and advantages in this modification are substantially the same as these in the embodiment of FIGS. 11a–11d.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly comprising:
    a magnetic head slider with at least one thin-film magnetic head element;
    a metal suspension for supporting said magnetic head slider;
    signal trace conductors formed via an insulation material layer on said metal suspension, for transmitting signals of said at least one thin-film magnetic head element; and
    external signal connection pads formed via an insulation material layer on said metal suspension and electrically connected to said signal trace conductors,
    at least part of said metal suspension directly under said external signal connection pads being removed.

2. The head gimbal assembly as claimed in claim 1, wherein said metal suspension comprises a metal load beam and a metal flexure disposed on said metal load beam, said external signal connection pads being formed on said metal flexure, and said at least cart of said metal suspension being removed includes at least part of said metal flexure directly under said external signal connection pads.

3. The head gimbal assembly as claimed in claim 2, wherein said at least part of said metal suspension being removed includes at least part of said metal load beam directly under said external signal connection pads.

4. The head gimbal assembly as claimed in claim 2, wherein at least one via hole is formed through said metal flexure directly under said external signal connection pads.

5. The head gimbal assembly as claimed in claim 4, wherein at least one via hole is also formed through said metal load-beam directly under said external signal connection pads.

6. The head gimbal assembly as claimed in claim 1, wherein said metal suspension comprises a metal flexure, said external signal connection pads being formed on said metal flexure, and said at least part of said metal suspension being removed includes at least part of said metal flexure directly under said external signal connection pads.

7. The head gimbal assembly as claimed in claim 6, wherein at least one via hole is formed through said metal flexure directly under said external signal connection pads.

8. The head gimbal assembly as claimed in claim 1, wherein said signal trace conductors are directly connected to said at least one thin-film magnetic head element.

9. The head gimbal assembly as claimed in claim 1, wherein said assembly further comprises an drive IC chip mounted on said metal suspension, said drive IC chip including a circuit for said at least one thin-film magnetic head element, and wherein said signal trace conductors are connected to said at least one thin-film magnetic head element through said drive IC chip.

10. The head gimbal assembly as claimed in claim 9, wherein said assembly further comprises power-supply trace conductors formed through-an insulation material layer on said metal suspension, for supplying power to said drive IC chip, and external power-supply connection pads formed through an insulation material layer on said metal suspension and electrically connected to said power-supply trace conductors.

11. The head gimbal assembly as claimed in claim 10, wherein said metal suspension directly under said external power-supply connection pads is not removed.

12. The head gimbal assembly as claimed in claim 10, wherein said metal suspension directly under said power-supply trace conductors is not removed remained.

13. The head gimbal assembly as claimed in claim 1, wherein at least part of said metal suspension directly under said signal trace conductor is removed.

14. The head gimbal assembly as claimed in claim 13, wherein said metal suspension comprises a metal load beam and a metal flexure disposed on said metal load beam, said signal trace conductors being formed on said metal flexure, and said at least part of said metal suspension being removed includes at least part of said metal flexure directly under said signal trace conductors.

15. The head gimbal assembly as claimed in claim 14, wherein said at least part of said metal suspension being removed includes at least part of said metal load beam directly under said signal trace conductors.

16. The head gimbal assembly as claimed in claim 13, wherein said metal suspension comprises a metal flexure, said signal trace conductors being formed on said metal flexure, and said at least part of said metal suspension being removed includes at least part of said metal flexure directly under said signal trace conductors.

* * * * *